United States Patent
Koar

(10) Patent No.: US 10,372,598 B2
(45) Date of Patent: Aug. 6, 2019

(54) METHOD AND DEVICE FOR DESIGN DRIVEN DEVELOPMENT BASED AUTOMATION TESTING

(71) Applicant: Wipro Limited, Bangalore (IN)

(72) Inventor: Sandeep Koar, Kolkata (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/878,199

(22) Filed: Jan. 23, 2018

(65) Prior Publication Data

US 2019/0179737 A1     Jun. 13, 2019

(30) Foreign Application Priority Data

Dec. 11, 2017   (IN) .............................. 201741044425

(51) Int. Cl.
*G06F 11/36*   (2006.01)
*G06F 8/20*    (2018.01)

(52) U.S. Cl.
CPC ............ *G06F 11/3688* (2013.01); *G06F 8/20* (2013.01); *G06F 11/3684* (2013.01)

(58) Field of Classification Search
CPC .................................................. G06F 11/3684
See application file for complete search history.

(56) References Cited

U.S. PATENT DOCUMENTS

| | | | | |
|---|---|---|---|---|
| 6,526,568 B1 * | 2/2003 | Izumi | ................... | G06F 11/3688 714/E11.208 |
| 8,352,237 B2 * | 1/2013 | Bassin | .................. | A61B 5/7275 703/22 |
| 8,635,056 B2 * | 1/2014 | Bassin | .................. | A61B 5/7275 703/22 |
| 8,683,442 B2 * | 3/2014 | Peranandam | ....... | G06F 11/3684 717/124 |
| 8,826,084 B1 * | 9/2014 | Gauf | .................... | G06F 11/3688 714/32 |
| 9,053,237 B2 * | 6/2015 | Channamsetti | ..... | G06F 11/3684 |
| 2002/0091968 A1 * | 7/2002 | Moreaux | ............. | G06F 11/3684 714/38.14 |

(Continued)

OTHER PUBLICATIONS

Fleurey, Franck, Jim Steel, and Benoit Baudry. "Validation in model-driven engineering: testing model transformations." Proceedings. 2004 First International Workshop on Model, Design and Validation, 2004.. (Year: 2004).*

(Continued)

*Primary Examiner* — Matthew J Brophy
(74) *Attorney, Agent, or Firm* — Pepper Hamilton LLP

(57) ABSTRACT

A method and device for design driven development based automation testing is disclosed. The method includes receiving a design document comprising an overview of a proposed product. The method further includes extracting functionality of the proposed product based on an analysis of at least one design object in the design document. The method includes converting the functionality of the proposed product into at least one test script based on the at least one design object. The method includes replacing one or more of the at least one design object with a corresponding real object in a developed product associated with the proposed product. The method further includes executing the at least one test script to test the developed product, in response to the replacing.

12 Claims, 5 Drawing Sheets

(56) References Cited

U.S. PATENT DOCUMENTS

| | | | | |
|---|---|---|---|---|
| 2003/0121025 | A1* | 6/2003 | Farchi | G06F 11/3676 |
| | | | | 717/124 |
| 2007/0279701 | A1* | 12/2007 | Hsu | G06F 8/30 |
| | | | | 358/403 |
| 2011/0066420 | A1* | 3/2011 | Bassin | A61B 5/7275 |
| | | | | 703/22 |
| 2012/0311426 | A1* | 12/2012 | Desai | G06F 17/2705 |
| | | | | 715/227 |
| 2012/0323550 | A1* | 12/2012 | Bassin | A61B 5/7275 |
| | | | | 703/22 |
| 2013/0074040 | A1* | 3/2013 | Peranandam | G06F 11/3684 |
| | | | | 717/124 |
| 2013/0185594 | A1* | 7/2013 | Budnik | G06F 11/3668 |
| | | | | 714/38.1 |
| 2016/0162385 | A1* | 6/2016 | Allen | G06F 11/368 |
| | | | | 714/38.1 |
| 2016/0239407 | A1* | 8/2016 | Ivancic | G06F 11/3604 |
| 2018/0113796 | A1* | 4/2018 | Meyers | G06F 11/3664 |

OTHER PUBLICATIONS

Bai, Xiaoying, et al. "Ontology-based test modeling and partition testing of web services." 2008 IEEE International Conference on Web Services. IEEE, 2008. (Year: 2008).*

Beer, Armin, Stefan Mohacsi, and Christian Stary. "IDATG: an open tool for automated testing of interactive software." Proceedings. The Twenty-Second Annual International Computer Software and Applications Conference (Compsac'98)(Cat. No. 98CB36241). IEEE, 1998. (Year: 1998).*

Elghondakly et al., "Waterfall and Agile Requirements-Based Model for Automated Test Cases Generation", Dec. 12, 2015, 3 pages, Retrieved from the Internet: <http://ieeexplore.ieee.org/abstract/document/7397285/>.

Javed et al., "Automated Generation of Test Cases Using Model-Driven Architecture", May 20, 2007, 2 pages, Retrieved from the Internet: <https://ieeexplore.ieee.org/abstract/document/4296714/>.

* cited by examiner

US 10,372,598 B2

METHOD AND DEVICE FOR DESIGN DRIVEN DEVELOPMENT BASED AUTOMATION TESTING

This application claims the benefit of Indian Patent Application Serial No. 201741044425, filed Dec. 11, 2017, which is hereby incorporated by reference in its entirety.

FIELD

This disclosure relates generally to automation testing and more particularly to method and device for design driven development based automation testing.

BACKGROUND

In today's fast growing world of ever evolving product lifecycles (especially software products), customer wants their products to be implemented and updated faster, when compared to their competitors. Customer wants more software releases with new features to be implemented in a very short time frame and without any defects. As a result, automation testing plays an importance role in the software development lifecycle. The automated software testing not only improves the quality, reliability, and performance of the product, but also reduces the time taken to run repetitive tests.

In today's scenario, software testing cannot be automated completely. A new software sprint has to be tested manually first and then in the next software release the previous sprint can be automated. However, the new features that are added in the new release have to be tested manually. By way of an example, in the conventional solutions, if currently released sprint is termed as Nth sprint, then N−1 sprint can be automated for further testing but the Nth sprint will have to be tested manually. There is no provision available for automating testing for the Nth sprint. Similarly, conventional solutions are also not able to automate testing of the N+1 or N+2 sprint. Additionally, in the conventional solutions, test cases can only be prepared once a module is ready. As a result, lot of time is wasted while waiting for the module to be tested.

Moreover, conventional models of automation testing are either test driven development or behavior driven development. In test driven development, the requirements are turned into very specific test case and a software product is improved to pass the new tests only. In behavior driven development, the focus is only on the behavior of the software which is to validate expected versus actuals rather than implementation.

SUMMARY

In one embodiment, a method for design driven development based automation testing is disclosed. The method includes receiving, by a testing automation device, a design document comprising an overview of a proposed product. The method further includes extracting, by the testing automation device, functionality of the proposed product based on an analysis of at least one design object in the design document. The method includes converting, by the testing automation device, the functionality of the proposed product into at least one test script based on the at least one design object. The method further includes replacing, by the testing automation device, one or more of the at least one design object with a corresponding real object in a developed product associated with the proposed product. The method includes executing, by the testing automation device, the at least one test script to test the developed product, in response to the replacing.

In another embodiment, a testing automation device for performing design driven development based automation testing is disclosed. The testing automation device includes a processor and a memory communicatively coupled to the processor, wherein the memory stores processor instructions, which, on execution, causes the processor to: receive a design document comprising an overview of a proposed product; extract functionality of the proposed product based on an analysis of at least one design object in the design document; convert the functionality of the proposed product into at least one test script based on the at least one design object; replace one or more of the at least one design object with a corresponding real object in a developed product associated with the proposed product; and execute the at least one test script to test the developed product, in response to the replacing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
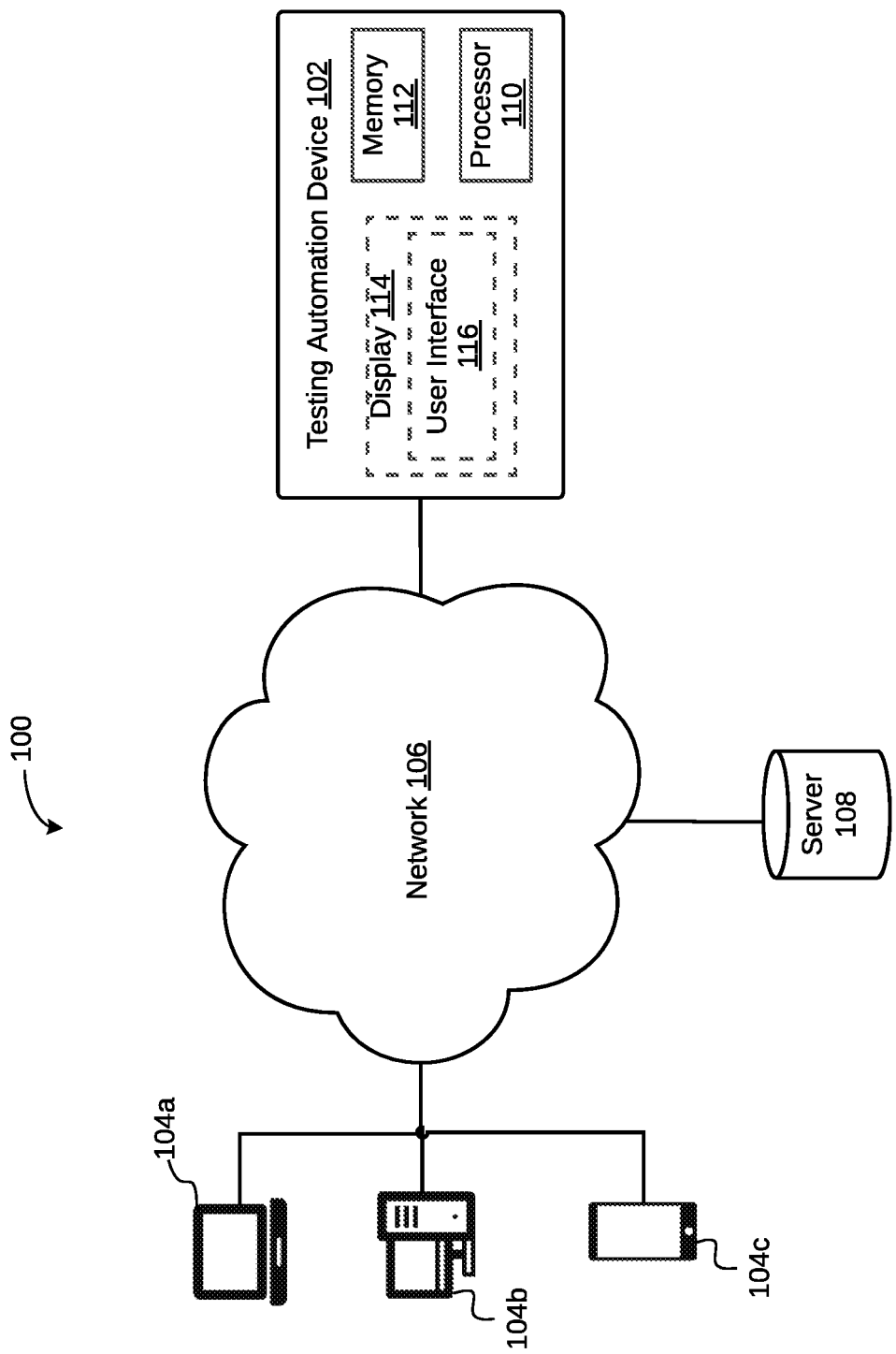
FIG. 1 is a block diagram illustrating a system for design driven development based automation testing, in accordance with an embodiment.

Additional illustrative embodiments are listed below. In one embodiment, a block diagram of a system 100 that enables design driven development based automation testing is illustrated in FIG. 1. System 100 includes a testing automation device 102 that performs design driven development based automation testing. Testing automation device 102 may receive one or more design documents that include an overview of a proposed product, which is required to be tested. The proposed product, for example, may be a software application. The one or more design documents may include detail regarding full functionality of the proposed product. A design document, for example, may include, but is not limited to design document, a User Experience (UX) document, a power point presentation, wireframes, a Visio diagram, a CAD document, an Autodesk inventor document, a SolidWorks document, a ProEngineer document, decision tables, flowcharts, or a UI designed in the form of image template.

The one or more design documents may be provided by one or more of a plurality of computing devices 104 (for example, a laptop 104a, a desktop 104b, and a smart phone 104c) via a network 106. Other examples of plurality of computing devices 104, may include, but are not limited to a phablet and a tablet. Network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The one or more design documents may be stored within plurality of computing devices 104. Alternatively, the one or more design documents may be stored on a server 108 and may be accessed by plurality of computing devices 104 or by testing automation device via network 106.

When a user of laptop 104a, for example, wants to test a proposed product, laptop 104a communicates with testing automation device 102, via network 106, and sends one or more design documents related to the proposed product. Testing automation device 102 then processes the one or more design documents to perform design driven development based automation testing for the proposed product. To this end, testing automation device 102 includes a processor 110 that is communicatively coupled to a memory 112, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 112 further includes various modules that enable performing design driven development based automation testing. These modules are explained in detail in conjunction with FIG. 2. Testing automation device 102 may further include a display 114 having a User Interface (UI) 116 that may be used by a user or an administrator to provide various inputs to testing automation device 102. Display 114 may further be used to display result of performing design driven development based automation testing. The functionality of testing automation device 102 may alternatively be configured within each of plurality of computing devices 104.

Figure 2:
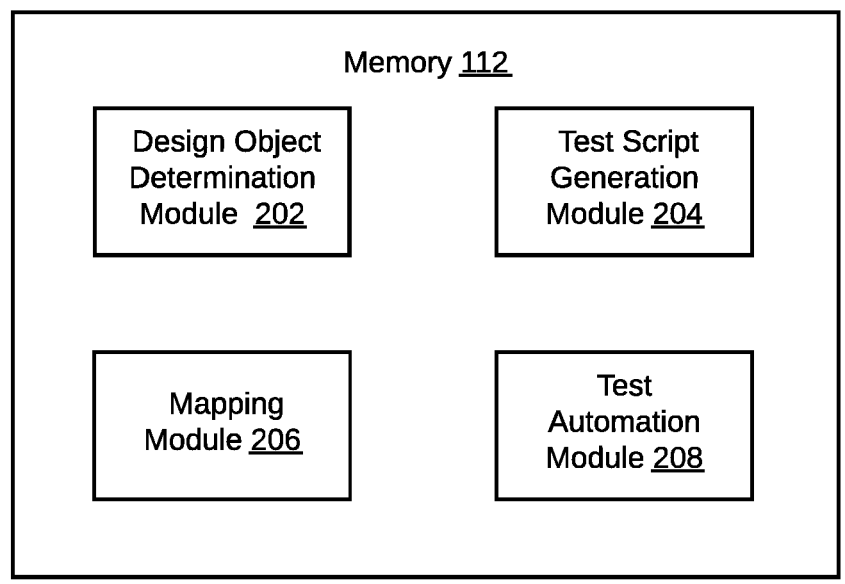
FIG. 2 is a block diagram illustrating various modules within a memory of a test automation device configured to perform design driven development based automation testing, in accordance with an embodiment.

Referring now to FIG. 2, a block diagram of various modules within memory 112 of testing automation device 102 configured to perform design driven development based automation testing is illustrated, in accordance with an embodiment. Memory 112 includes a design object determination module 202, a test script generation module 204, a mapping module 206, and a test automation module 208.

Design object determination module 202 may receive a design document that includes an overview of a proposed product and extracts functionality of the proposed product based on an analysis of one or more design objects in the design document. This is further explained in detail in conjunction with FIG. 3. The design document may include detail regarding full functionality of the proposed product. A design document, for example, may include, but is not limited to design document, a User Experience (UX) document, a power point presentation, wireframes, a Visio diagram, a CAD document, an Autodesk inventor document, a SolidWorks document, a ProEngineer document, decision tables, flowcharts, or a UI designed in the form of image template.

Test script generation module 204 may convert the functionality of the proposed product into one or more test scripts based on the one or more design objects. This is further explained in detail in conjunction with FIG. 3. Thereafter, mapping module 206 may map each of the one or more design objects to corresponding real objects of a developed product associated with the proposed product. Based on the mapping, mapping module 206 may determine one or more differences between a design object from the one or more design objects and a corresponding real object in the developed product. Mapping module 206 may then replace one or more design objects with a corresponding real object in the developed product. In response to the replacing, test automation module 208 may execute the one or more test scripts to test the developed product. This is further explained in detail in conjunction with FIG. 4.

Figure 3:
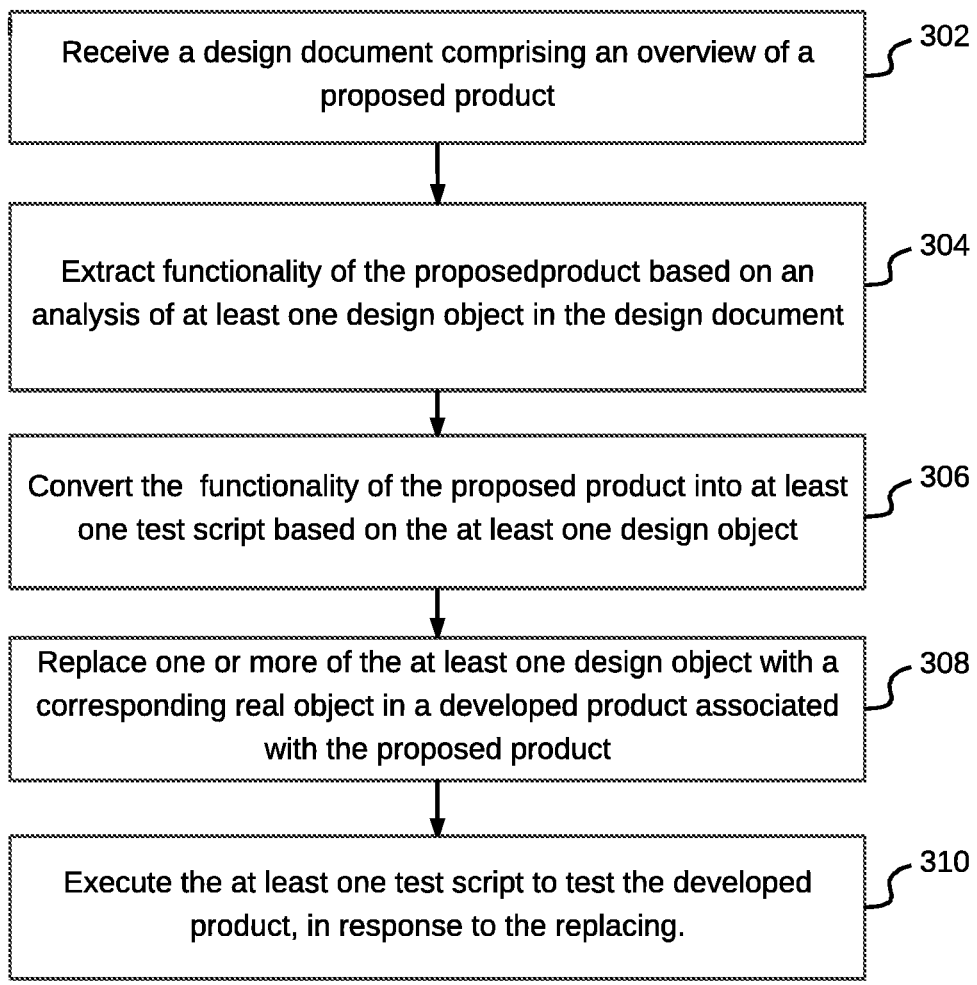
FIG. 3 illustrates a flowchart of a method for design driven development based automation testing, in accordance with an embodiment.

Referring now to FIG. 3, a flowchart of a method for design driven development based automation testing is illustrated, in accordance with an embodiment. The design driven development based automation testing may be performed to test a proposed product, which, for example, may be a software application. This results in speeding up Agile and DevOps processes. To this end, at step 302, testing automation device 102 may receive a design document that includes an overview of the proposed product. The design document may include detail regarding full functionality of the proposed product. The details may be in the form of one or more design objects. The one or more design objects may include layout and screen navigations indicative of functionality of the proposed product. By way of an example, snapshot of a webpage of a search engine (for example, GOOGLE®) may be a design object in a design document. Other example could be the snapshot of login screen of an application like GMAIL®, SALESFORCE®, CHASE® mobile app etc. In all these cases the snapshots which are designed by Design or User Experience (UX) team is going to be mapped with the corresponding layer or page of real Application Under Test (AUT) and by virtue of object mapping capability the design page will form automated test cases which is ready to execute on AUT.

A design document, for example, may include, but is not limited to design document, a User Experience (UX) document, a power point presentation, wireframes, a Visio diagram, a CAD document, an Autodesk inventor document, a SolidWorks document, a ProEngineer document, decision tables, flowcharts, or a UI designed in the form of image template.

At step 304, testing automation device 102 may extract functionality of the proposed product based on an analysis of one or more design objects in the design document. Based on the one or more design objects, testing automation device 102 may convert, at step 306, the functionality of the proposed product into one or more test scripts. The one or more test scripts include one or more business test scripts and/or one or more functional test scripts associated with the proposed software product. The one or more test scripts may be generated for various current and prospective sprints of the proposed product design, for example, for N, N+1 and N+2 . . . etc., where N represents a current design version of the proposed product.

Once the proposed product has been materialized into a developed product, testing automation device 102, at step 308, may replace one or more design objects with corresponding one or more real object in the developed product. In an embodiment, once the proposed product has been developed, one or more design objects may undergo partially or complete change from associated real objects in the developed product. Replacing one or more design objects is further explained in detail in conjunction with FIG. 4. In response to replacing the one or more design objects, testing automation device 102 may execute the one or more test scripts to test the developed product at step 310.

Figure 4:
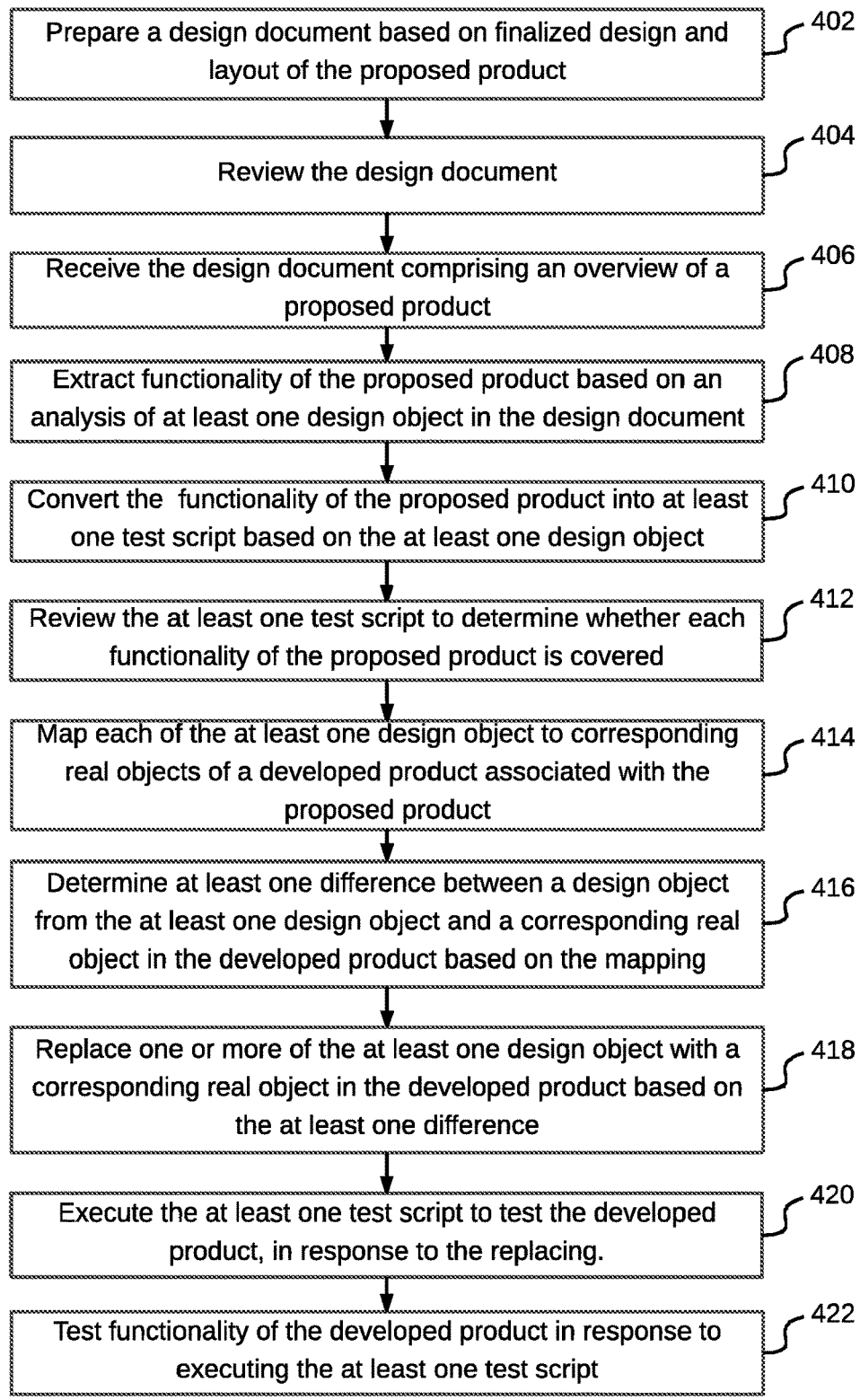
FIG. 4 illustrates a flowchart of a method for design driven development based automation testing, in accordance with another embodiment.

Referring now to FIG. 4, a flowchart of a method for design driven development based automation testing is illustrated, in accordance with another embodiment. To start with, requirements and functionalities of a proposed product are defined and a design and layout of the proposed product is finalized. Thereafter, at step 402, a design document may be prepared based on the finalized design and layout of the proposed product. The design document may include detail regarding full functionality of the proposed product. A design document, for example, may include, but is not limited to design document, a User Experience (UX) document, a power point presentation, wireframes, a Visio diagram, a CAD document, an Autodesk inventor document, a SolidWorks document, a ProEngineer document, decision tables, flowcharts, or a UI designed in the form of image template.

The design document may then be reviewed at step 404 to ensure that all functionalities of the proposed product are included in the design document and in order to understanding flow of the proposed product. At step 406, the design document that includes an overview of the proposed product, may be received. Thereafter, at step 408, functionality of the proposed product may be extracted based on an analysis of one or more design objects in the design document. Based on the one or more design objects, at step 410, the functionality of the proposed product is converted into one or more test scripts. The one or more test scripts include one or more business test scripts and/or one or more functional test scripts associated with the proposed software product.

At step 412, the one or more test scripts may be reviewed to determine whether each functionality of the proposed product is covered or not. The one or more test scripts may be revised in case one or more functionalities of the proposed product are not covered. Once the proposed product materializes into a developed product, each of the one or more design objects may be mapped to corresponding real objects of the developed product, at step 414.

Based on the mapping, at step 416, one or more differences between a design object from the one or more design objects and a corresponding real object in the developed product may be determined. These difference may arise as a result of one or more modifications made during development phase for the proposed product. At step 418, one or more design objects that are different from the corresponding real objects in the developed product, may be replaced with the corresponding real objects. In an embodiment, a design object is replaced by the corresponding real object in the one or more test scripts generated at step 410, when one or more differences exists between the design object and the corresponding real object. Based on the modified one or more test scripts, at step 420, the one or more test scripts may be executed to test the developed product. In response to executing the at least one test script, functionality of the developed product may be tested at step 422.

Thus, test engineers would have to spend minimum effort to identify real objects that would replace design object in the one or more test script. As a result, test engineers would be able to get the QA part done early in stage, thereby facilitating the developed product to reach Go-To-Market early.

Figure 5:
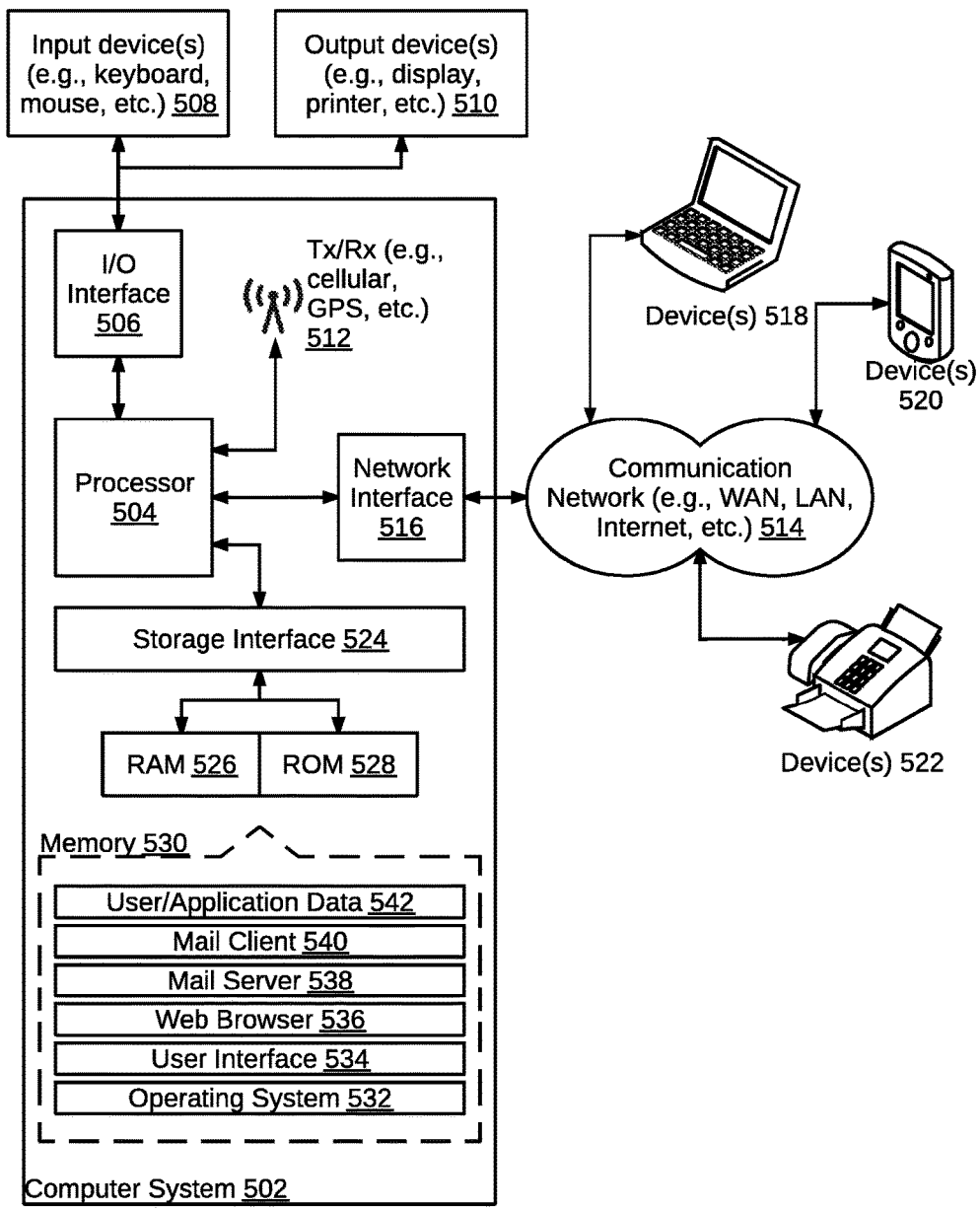
FIG. 5 illustrates a block diagram of an exemplary computer system for implementing various embodiments.

FIG. 5 is a block diagram of an exemplary computer system for implementing various embodiments. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'SCORE® processor, ITANIUIM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for design driven development based automation testing. The method reduces the time required for testing, as it involves automation testing in early stages of software development lifecycle. The method further automates not only regression tests but also functional and sprint tests. Moreover, not only the current sprint, but future sprints can also be automated. The device reduces testers waiting time as they don't have to wait for the original software product to be ready in order to write test cases. The testers only require a design document to get started.

The specification has described method and device for design driven development based automation testing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for design driven development based automation testing, the method comprising:
   receiving, by a testing automation device, a design document comprising an overview of a proposed product at a development phase;
   extracting, by the testing automation device, functionality of the proposed product based on an analysis of at least one design object in the design document, wherein the at least one design object includes a snapshot of a layout and screen navigations indicative of the functionality of the proposed product;
   converting, by the testing automation device, the functionality of the proposed product into at least one test script based on the at least one design object;
   determining whether the functionality of the proposed product is covered in a developed product;
   modifying the at least one test script that correspond to the functionality of the proposed product that is not covered in the developed product, based on the determination;
   mapping, by the testing automation device, each of the at least one design object to a corresponding real object of the developed product;
   determining, by the testing automation device, at least one difference between a design object from the at least one design object and a corresponding real object in the developed product based on the mapping;
   replacing, by the testing automation device, based on the determination, one or more of the at least one design object that is different from a corresponding real object in the developed product associated with the proposed product, with the corresponding real object in the at least one test script; and
   executing, by the testing automation device, the modified test script to test the developed product, in response to the replacing.

2. The method of claim 1, wherein the design document comprises at least one of a design document, a User Experience (UX) document, a power point presentation, or wireframes.

3. The method of claim 1 further comprising preparing the design document based on finalized design and layout of the proposed product.

4. The method of claim 1, wherein the at least one test script comprises at least one of a business test script and a functional test script.

5. The method of claim 1 further comprising reviewing the at least one test script to determine whether each functionality of the proposed product is covered.

6. The method of claim 1 further comprising testing functionality of the developed product in response to executing the at least one test script.

7. A testing automation device for performing design driven development based automation testing, the testing automation device comprising:
   a processor; and
   a memory communicatively coupled to the processor, wherein the memory stores processor instructions, which, on execution, causes the processor to:
   receive a design document comprising an overview of a proposed product at a development phase;
   extract functionality of the proposed product based on an analysis of at least one design object in the design document, wherein the at least one design object includes a snapshot of a layout and screen navigations indicative of the functionality of the proposed product;
   convert the functionality of the proposed product into at least one test script based on the at least one design object;
   determine whether the functionality of the proposed product is covered in a developed product;
   modify the at least one test script that correspond to the functionality of the proposed product that is not covered in the developed product, based on the determination;
   map each of the at least one design object to a corresponding real object of the developed product;
   determine at least one difference between a design object from the at least one design object and a corresponding real object in the developed product based on the mapping;
   replace, based on the determination, one or more of the at least one design object that is different from a corresponding real object in the developed product associated with the proposed product, with the corresponding real object in the at least one test script; and execute the modified test script to test the developed product, in response to the replacing.

8. The testing automation device of claim 7, wherein the design document comprises at least one of a design document, a User Experience (UX) document, a power point presentation, or wireframes.

9. The testing automation device of claim 7, wherein the processor instructions further cause the processor to prepare the design document based on finalized design and layout of the proposed product.

10. The testing automation device of claim 7, wherein the at least one test script comprises at least one of a business test script and a functional test script.

11. The testing automation device of claim 7, wherein the processor instructions further cause the processor to review the at least one test script to determine whether each functionality of the proposed product is covered.

12. The testing automation device of claim 7, wherein the processor instructions further cause the processor to test functionality of the developed product in response to executing the at least one test script.

* * * * *